United States Patent [19]

Woodriff et al.

[11] 4,035,083
[45] July 12, 1977

[54] BACKGROUND CORRECTION IN SPECTRO-CHEMICAL ANALYSIS

[76] Inventors: Ray A. Woodriff, 521 W. Grant St., Bozeman, Mont. 59715; Daniel T. Woodriff, 2308 - 10th St., Monroe, Wis. 53566

[21] Appl. No.: 575,046

[22] Filed: May 5, 1975

Related U.S. Application Data

[62] Division of Ser. No. 257,596, May 30, 1972.

[51] Int. Cl.² ............... G01N 21/40; G01J 3/36
[52] U.S. Cl. ..................... 356/115; 250/225; 356/82; 356/117; 356/119
[58] Field of Search .......... 356/114, 115, 116, 117, 356/119, 82; 250/225

[56] References Cited

U.S. PATENT DOCUMENTS 3,738,755  6/1973  Chaney et al. ............... 356/117

Primary Examiner—Vincent P. McGraw
Attorney, Agent, or Firm—Fitch, Even, Tabin & Luedeka

[57] ABSTRACT

Various methods and apparatus are disclosed for providing a background corrected measure of the concentration of a sample element in absorption and emission spectro-chemical analysis using the principles of the Zeeman effect and certain other related effects using a magnetic field.

10 Claims, 23 Drawing Figures

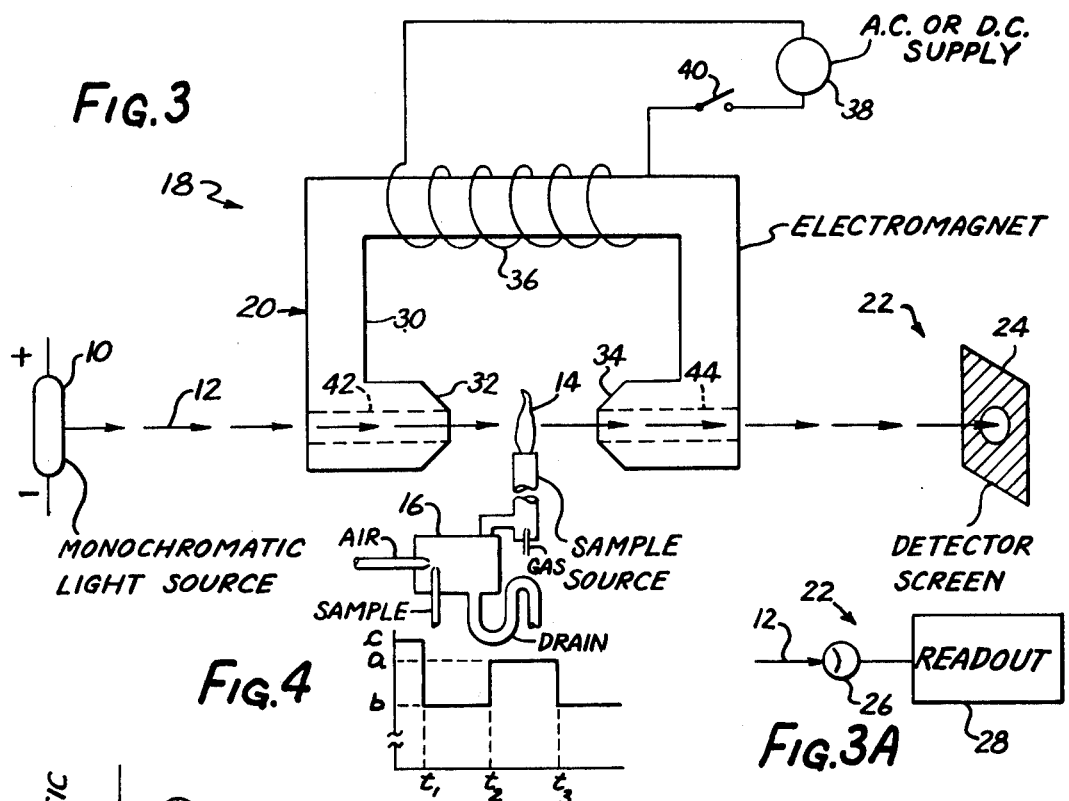
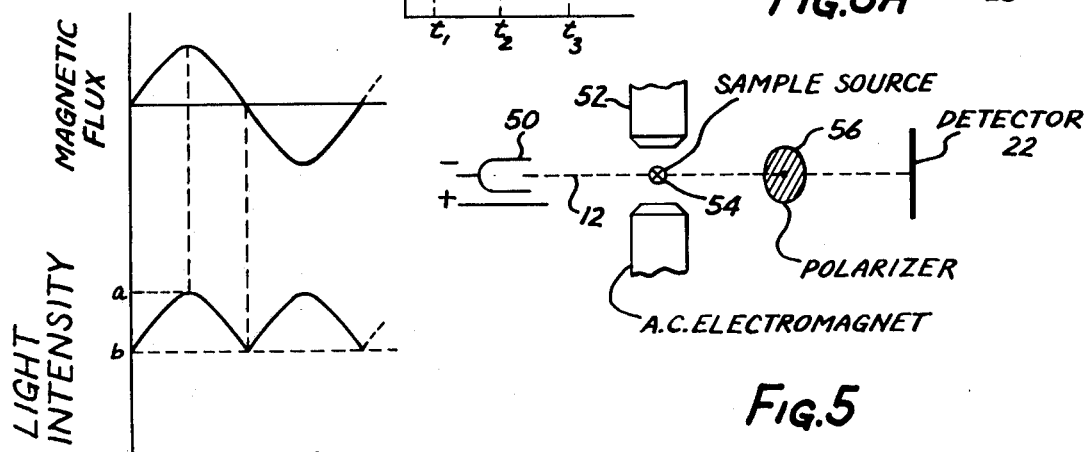
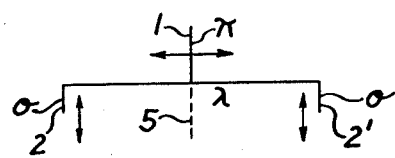
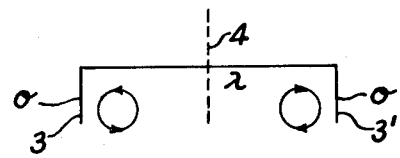

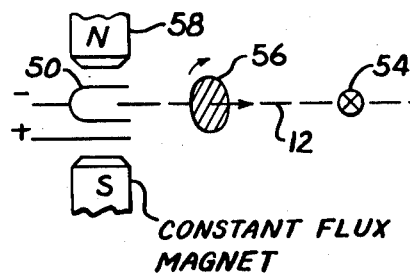
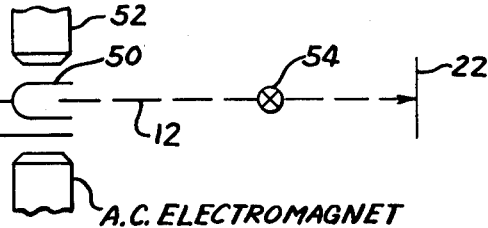
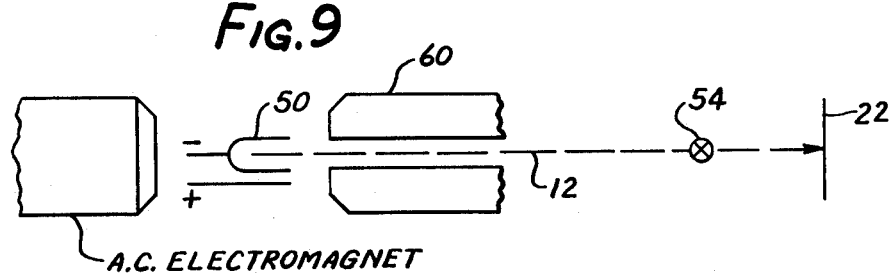
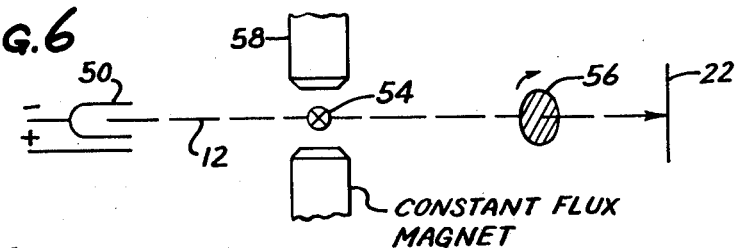
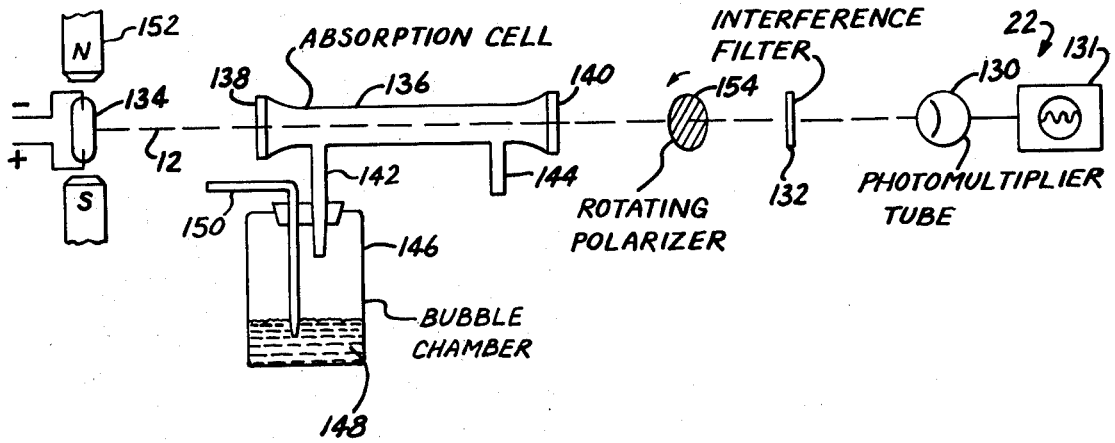

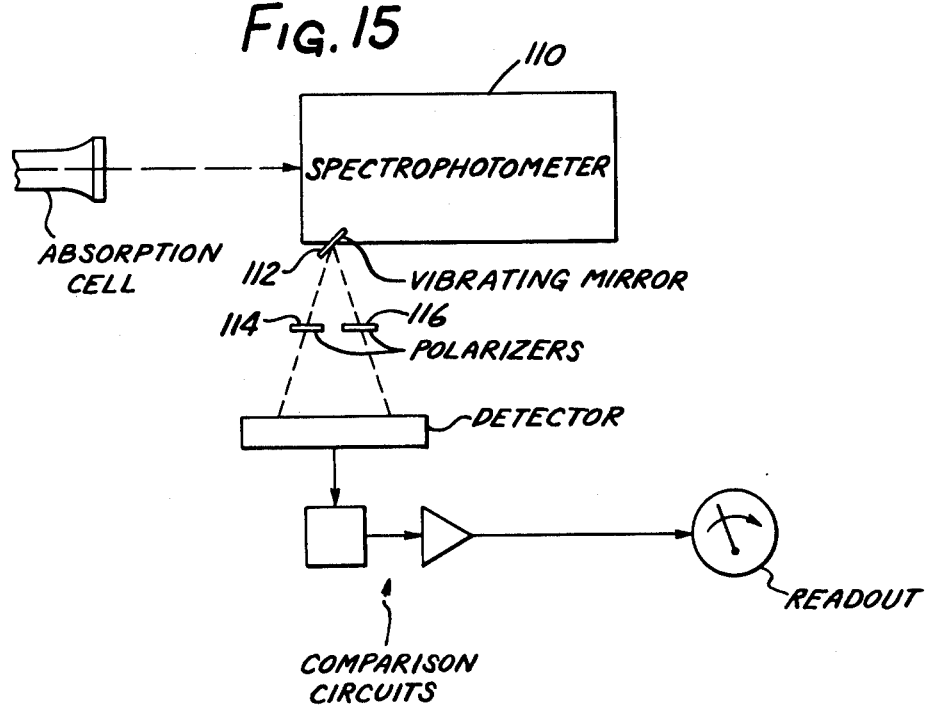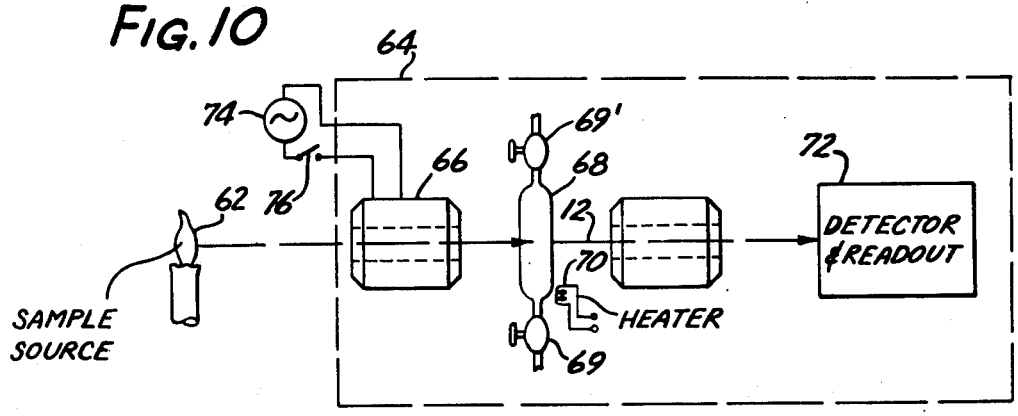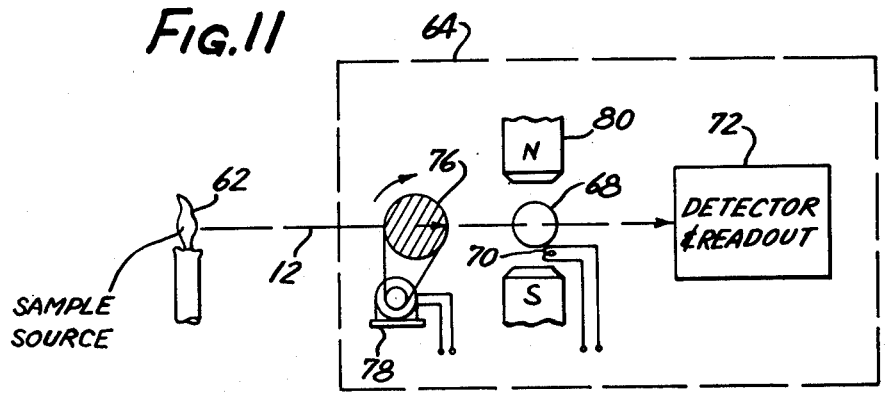

BACKGROUND CORRECTION IN SPECTRO-CHEMICAL ANALYSIS

This is a division of application Ser. No. 257,596, filed May 30, 1972.

The present invention relates to atomic absorption and emission spectroscopy, and particularly to methods and apparatus for providing a corrected measure of the concentration of a sample element by spectro-chemical analysis.

The general application of atomic absorption spectroscopy to chemical analysis is now well known and widely used as one of the principle methods of trace-element analysis. However, although the sensitivity of this method may permit quantities as small as $10^{-12}$ grams to be detected, the accuracy of the method has been limited by unwanted background absorption (or emission) and scattering. Although chemical treatment of the sample to separate the matrix constituents from the element to be analyzed is generally desirable to minimize these background and scattering effects (hereinafter referred to merely as "background"), complete, or even substantially complete, correction cannot generally be attained. Other techniques for correction have also heretofore been employed, such as various separated-double-beam or reference-beam methods, but these have been difficult to apply effectively, and have been generally inadequate for some purposes.

Accordingly, it is an object of the present invention to provide improved methods and apparatus in spectro-chemical analysis for compensating for the absorption or emission of light by species other than the analyte atoms, and for providing a background corrected measure of the sample element concentration.

This and other objects of the invention are more particularly set forth in the following detailed description and the accompanying drawings, of which:

FIGS. 1 and 2 are graphical illustrations depicting certain principles involved in various embodiments of the present invention.

FIG. 3 is a schematic illustration, partially in elevation and partially in perspective, showing apparatus for practicing a method in accordance with an embodiment of the present invention.

FIG. 3A is a schematic diagram illustrating a detector which may be used in the apparatus of FIG. 3.

FIGS. 4 and 4A are graphical illustrations showing waveforms involved in the operation of the apparatus of FIGS. 3 and 3A.

FIG. 5 is a schematic illustration, partially in plan and partially in perspective, showing alternative apparatus to that of FIG. 3 in accordance with another embodiment of the invention.

FIGS. 6 through 15 and 19 through 21 are schematic illustrations showing various other apparatus and arrangements in accordance with further embodiments of the invention in its various aspects.

Figure 16:
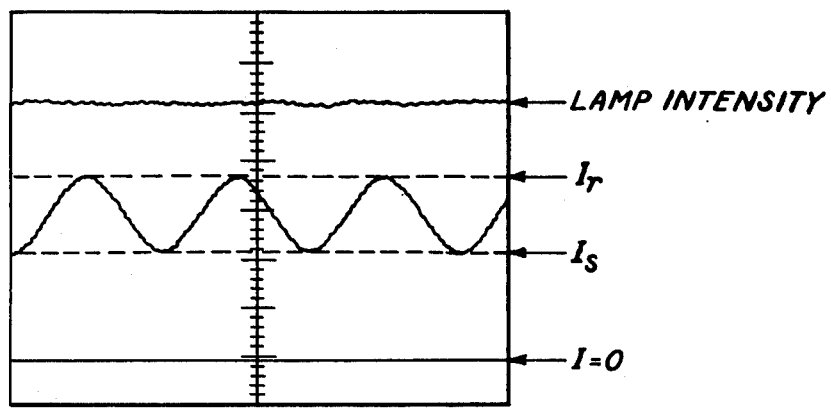
Figure 17:
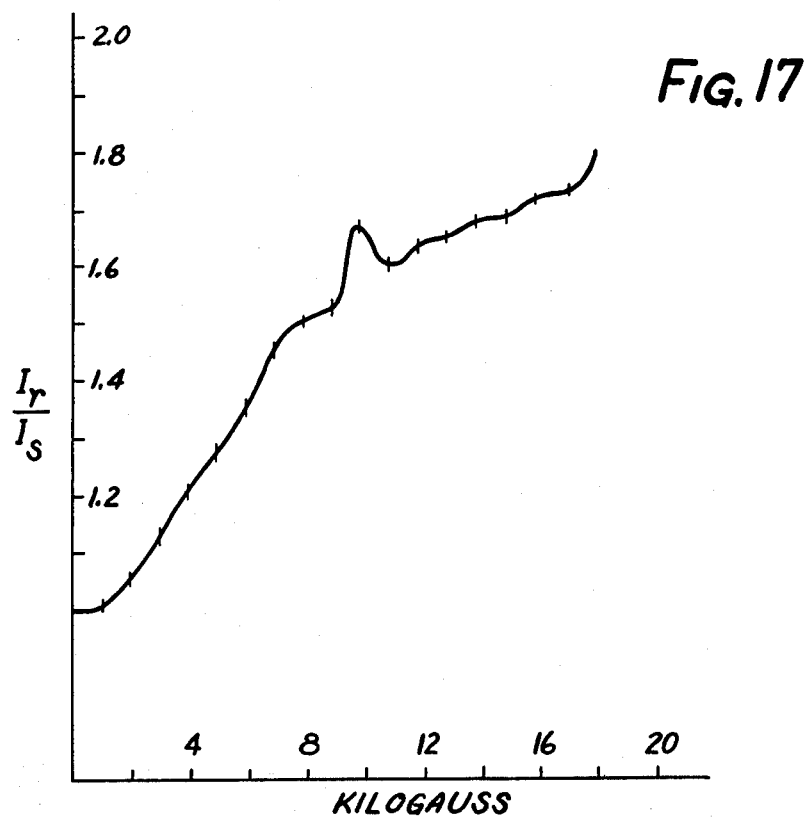
Figure 18:
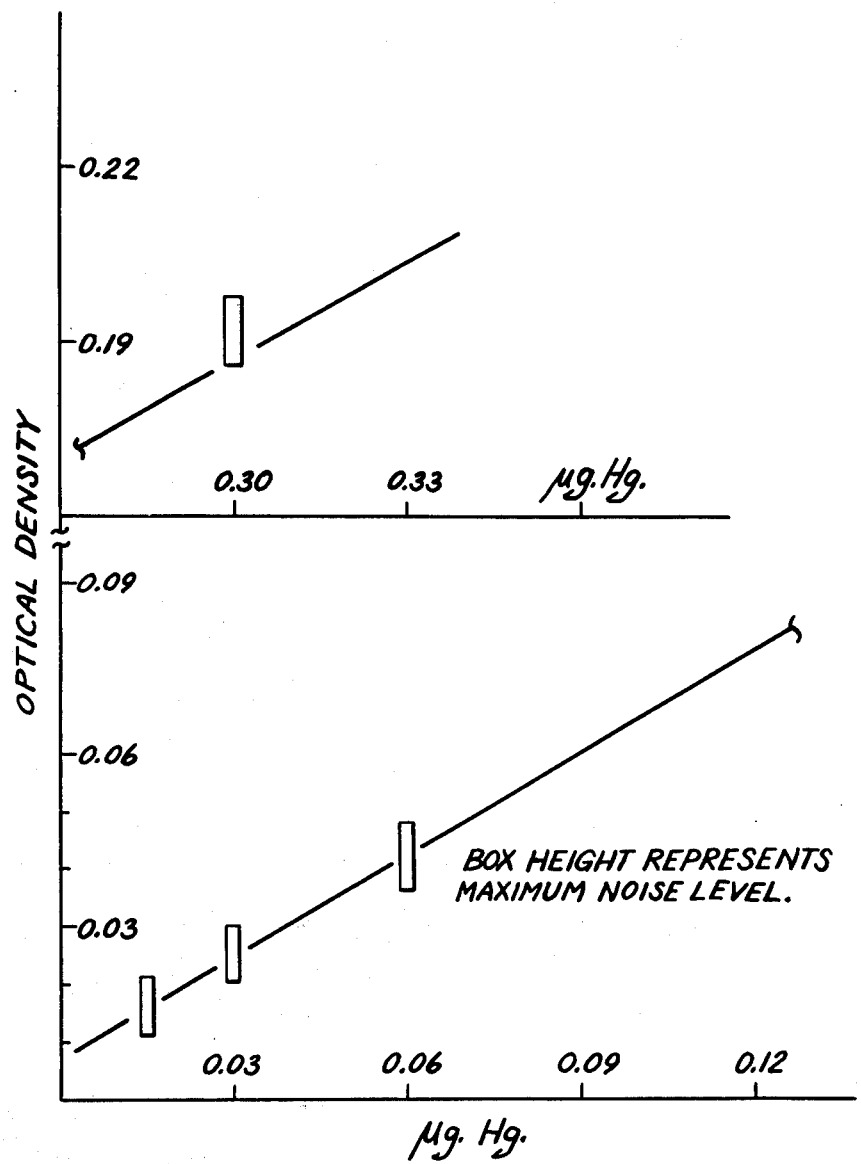

FIGS. 16 through 18 are graphical illustrations showing an example of the operation and results obtained in the practice of the present invention.

The present invention, in its broadest or most general aspects, stems from the recognition that background atomic absorption or emission in spectro-chemical analysis can be corrected by utilizing the Zeeman effect, or certain related effects, in various ways, and by means of various arrangements of apparatus, described in detail hereinafter. The Zeeman effect, in very simplified terms, is believed to be produced by the change in the energy levels of atoms due to the application of a magnetic field thereto, and this effect has long been known. The Zeeman effect is discussed in many publications, including such standard texts as *Physical Optics* by Wood, The MacMillan Company, 1928, Pages 496 through 547 and *Introduction To Atomic Spectra* by White, McGraw-Hill Book Company, Inc., 1934, Pages 149 through 170 and 215 through 247.

First observed as a splitting into three components of the emission line of mercury in a magnetic field, this triplet splitting was designated the "normal" Zeeman effect, and was explainable in terms of classical atomic theory. Later observations with other spectral lines revealed splitting into more than three components, and such splitting was designated as the "anomalous" Zeeman effect, since it was not explainable in terms of classical theory. At present, the normal Zeeman effect is believed to be due to the orbital magnetic moment of the electrons, while the anomalous effect is believed to be due to the spin magnetic moment of the electrons. However, for the purposes of the present invention, it suffices to say that for any particular element, the anomalous Zeeman effect will generally revert to the normal Zeeman effect when a sufficiently high intensity magnetic field is applied, the particular required intensity depending on the specific element involved.

Further, it has heretofore been recognized and is well known that when a spectral line splits in a magnetic field, the components into which it splits are polarized either parallel or perpendicular to the magnetic field if viewed (or detected) perpendicular to the field, and circularly polarized when viewed (or detected) along an axis parallel to the field (i.e., along the longitudinal axis of the lines of force of the magnetic field).

More particularly, FIGS. 1 and 2 show the customary graphical representations of the Zeeman splitting phenomenon for a particular line, FIG. 1 representing the effect when the optical axis for viewing or detection is perpendicular to the magnetic field lines and FIG. 2 representing the effect when the optical axis is parallel to the magnetic field lines. The length of the ordinate or vertical lines is generally made proportional to optical intensity (or density), and wavelength λ (or frequency) is poltted along the abscissa or horizontal line.

Referring first to FIG. 1, the π component 1 at the resonance wavelength is conventionally drawn above the horizontal, and is polarized parallel to the magnetic field where it intersects the optical axis, indicated by the adjacent horizontal arrow. The σ components 2 and 2' at the respective shifted wavelengths are conventionally drawn below the horizontal and are polarized perpendicular to the magnetic field where it intersects the optical axis, indicated by the adjacent vertical arrows.

Referring now to FIG. 2, where the magnetic field is parallel to the optical axis, only the σ components 3 and 3' at the respective shifted wavelengths are visible, and they become left and right circularly polarized in opposite directions as indicated by the adjacent circular arrows. The broken line 4 which bisects the σ components in FIG. 2 at the resonance wavelength, represents the unpolarized line normally present without the effect of the magnetic field. Likewise, in FIG. 1, the broken line 5 at the resonance wavelength, considered together with the length of the π component, represents the unpolarized line normally produced without the magnetic field. In either case, the total length of the unpolarized line, representing intensity, equals, in theory, the sum of the lengths (or intensities) of all of the $\pi$ and $\sigma$ components.

With respect to the displacement or shifting of the $\sigma$ components, the displacement (in terms of frequency) $\Delta v$, of each sigma component is given according to classical theory by $\Delta v = eB/4\pi m_e$ where $e$ and $m_e$ are the respective charge and mass of the electron and B is the magnetic flux density. However, the actual magnitude and character of the splitting of a spectral line depends principally upon how the energy levels are split for both of the electronic states involved in the transition. For the mercury 2537 Angstrom line a simple triplet is observed in which the splitting is 3/2 larger than the classically predicted value. In the case of the sodium $D_1$ line, two $\sigma$ components and two $\pi$ components are found, the $\sigma$ components being displaced four thirds of the expected classical value, while the $\pi$ components are displaced a smaller amount. Splittings which are large enough to be useful for the purposes of the present invention generally require relatively large magnetic fields. For example, the fields required to displace the $\sigma$ components 0.05 Angstrom are about 11 kilogauss for mercury and about 2 kilogauss for sodium.

These various optical phenomena associated with the Zeeman and related effects involving the action of a magnetic field on a gaseous element are utilized in accordance with the invention to provide quantitative determinations of element concentration which are inherently corrected for background emission or absorption due to the presence of the matrix elements with the sample and due to scattering. There are a number of ways in which the principles of the invention may be utilized to produce a unique reference system for background correction as indicated above, and although a number of examples are illustrated and described hereinafter, they are merely exemplary.

Referring now to FIGS. 3 and 3A, there is schematically shown an arrangement of apparatus for providing a background corrected measure of the concentration of a sample element by spectro-chemical analysis, comprising a monochromatic reference light source 10 which produces a beam of light having a given resonance wavelength corresponding to the optical resonance wavelength of the sample element to be analyzed and directed along an optical axis 12, indicated by the arrows. A sample source, illustrated as flame 14 from a conventional gas burner, contains in a gaseous state the sample element to be analyzed, the sample element being typically introduced into the flame by means of a pneumatic nebulizer 16 or an ultrasonic nebulizer (not shown) or in any other conventional manner. The sample source flame is disposed on the optical axis 12 and spaced from the light source 10 therealong so that both the reference source and the sample source are in direct optical alignment. Means, indicated generally as 18 and including a magnet 20, is provided for shifting the sample source (or reference source) resonance wavelength to a different value so that one of the wavelengths provides a first measurement signal indicative of the background absorption (or emission) in the sample and the other wavelength provides a second measurement signal indicative of the sample plus background absorption (or emission). Detector means 22, which is illustrated as a light sensitive or photographic screen 24 in FIG. 3 and as a photocell 26 couple to an electronic read-out device 28 in FIG. 3A, are used to receive and determine the difference between the first and second measurement signals to provide the corrected measure of the sample element concentration.

The magnet 20 is an electromagnet comprising a C-shaped iron core 30 having opposing pole pieces 32 and 34 on opposite sides of the sample flame 14 and a winding 36 disposed about the core and connected to a source of electric power such as an a.c. or d.c. supply 38 through a switch 40. The pole pieces 32 and 34 in the embodiment of FIG. 3 have aligned apertures or bores 42 and 44, respectively, which are concentric to the optical axis 12 of the apparatus. The light beam follows the optical axis 12 and thus passes through the pole piece 32, the sample flame 14, the pole piece 34, and is received by detector 22. With this arrangement, then, closure of the switch 40 energizes the winding 36 and thereby produces a magnetomotive force in the magnetic circuit formed by the magnet core 30 and the gap between the pole pieces 32 and 34 so as to create longitudinal magnetic lines of force within the gap which intersect the sample flame 14 and are generally parallel to the optical axis 12. The longitudinal magnetic field applied to the sample causes the type of shifting illustrated in FIG. 2, and described above.

With the switch 40 in its open position, the field intensity of the magnet 20 will be zero and the matrix elements in the flame 14 will absorb some of the light sent through the atomized sample from the monochromatic light source 10, in addition to the absorption from the sample element. Therefore, this matrix absorption, in addition to the scattering which will be produced, results in the spectral light energy or intensity received at the detector screen 24 not being a known measure of the concentration of the element being determined.

The intensity (or optical density) produced under the various conditions is graphically illustrated in FIG. 4. With no flame and the magnet off, the output light intensity is indicated by the level $c$. When the sample containing flame is lighted at $t_1$, the light intensity at the detector will be that indicated as level $b$. Then, with a source of direct current used for the supply 38, when the switch 40 is closed at time $t$, the resonance wavelength of the sample source will be shifted due to the Zeeman effect into $\sigma$ components displaced from the resonance wavelength, and the amount of absorption of the light from the reference light source 10 will decrease. Thus, the spectral line energy or intensity received at the detector screen 24 will therefore increase to the level indicated as $a$, and $c - a$ will be indicative of the background absorption. When the switch 40 is again opened at $t_3$, the shifted wavelength components will return to the original resonance wavelength of the light source 10 and the light intensity at the detector screen 24 will decrease to level $b$ due to the absorption of the sample. The fractional decrease in source light when the flame is lighted with the magnet on, is a measure of background absorption and scattering, and the fractional decrease in source light when the magnet is turned off is a measure of the sample concentration, provided that the magnetic field is strong enough to give adequate separation of the spectral line.

In other words, the fractional decrease in the emerging source light intensity at the detector screen 24 when the magnet is turned off is a reproducible measure of the concentration of the element in the flame to be analyzed. That is, the light intensity at level $b$ is a measurement signal corresponding to the amount of absorption due to both the sample element and the background, while the light intensity at level *a* corresponds to the background only. Thus, the difference between these two levels of light intensity, $a - b$, corresponds or is a measurement of the amount or concentration of the sample element.

Thus, when a photographic light sensitive paper is employed for the detector screen 24 and is positioned to intersect the optical axis 12 of the apparatus shown in FIG. 3 to receive the output light beam with the magnet on for a short, but predetermined time, so as to expose a given spot on the photographic paper, and then the paper is moved to position a different spot on the optical axis 12 for the same exposure time with the magnet turned off, the difference in optical density is a measure of the actual concentration of the sample element when the apparatus is calibrated using a standard sample. The amount of absorption is a logarithmic function of the sample element concentration, and thus this function may be readily determined by conventional graphical calibration or standardizing techniques using known samples.

Alternatively, of course, the output light may be received by the detector which is schematically shown in FIG. 3A, wherein the light intensity is detected by a photocell 26, such as a photomultiplier tube or any other suitable photoelectric device, which provides an electrical output signal having an amplitude corresponding to the intensity of the received light. This electrical signal is then fed to any suitable read-out device 28, such as a meter, scope, oscillograph, etc., as well as to suitable circuitry for deriving the difference between the readings with and without the magnetic field. Of course, if desired, the difference may be calculated manually from direct readings under each condition.

When the electromagnet 20 is connected to an alternating current supply 38, rather than a direct current supply, and the switch 40 is closed, an alternating magnetic flux will be produced between the pole pieces 32 and 34 having an intensity which continuously varies in a sinusoidal manner from zero to a peak value as shown in FIG. 4A. Employing an oscillographic type of read-out device 28 (FIG. 3A) a full wave rectified sinusoidal waveform of light intensity as a function of time will be produced like that shown in the lower graph of FIG. 4A. This waveform will be substantially in phase with the oscillating magnetic flux across the magnetic gap. Thus, as in the previously described direct current example, the corrected measure of the amount or concentration of the sample element will be given by the difference between the illumination level with the magnet on and the illumination level with the magnet off. This is given by the absolute value of $a - b$, with the reference level corresponding to the intensity produced by the sample element plus the background. Calibration may be achieved by any conventional technique, and either the peak or rms values of current or voltage may be plotted from the detector against known sample concentrations in the flame 14 to define a suitable calibration curve.

The apparatus arrangement in FIG. 3 is similar to that used for demonstrating the Zeeman effect (or what might be considered as the "inverse Zeeman effect") without the use of a spectroscope, but when successive readings are taken under the conditions described, which readings are then differenced, a corrected measure of the sample element concentration results. The arrangement was satisfactorily used for the analysis of sodium (5890 Angstrom line) where the sodium was introduced into the sample flame by placing a solution of sodium calcium chloride on a nonvolatile support, such as a platinum or nichrome wire or asbestos. However, in the apparatus of FIG. 3, the sample is introduced with a conventional nebulizer, as indicated above, which is preferred for precise quantitative analysis. The pneumatic nebulizer 16 comprises, as shown, a jet for introducing air, oxygen, nitrous oxide or other flame components at a high velocity over the tip of a capillary through which is introduced the sample in liquid form. The spray or nebulized droplets are carried into the base of the burner where they mix with the gas or other flame component, as shown, and then procede up the burner tube and burn to atomize the sample. A drain tube (having an appropriate trap) is also provided to remove the large drops which fall out of the spray.

Of course, the sample may be atomized by other means, such a furnace (see, e.g., Woodriff et al., Applied Spectroscopy, Vol. 24, 1970, pp. 530–533). Using such a technique, the sample can be introduced directly into the furnace as a solid and will permit greater accuracy and sensitivity in the analysis.

For elements other than sodium, an interference filter is preferably positioned in front of the detector or a spectrophotometer is substituted for the detector in the arrangement of FIG. 3.

Referring now to FIG. 5, there is shown another arrangement of apparatus for providing a background corrected measure of the concentration of a sample element by spectrochemical analysis, wherein a hollow cathode light source 50 provides an essentially monochromatic but broad light beam along optical axis 12 when connected to the appropriate electrical potential, as shown. An a.c. electromagnet 52 has its pole pieces arranged so that the magnetic field is directed normal or perpendicular to the optical axis 12 at the sample source 54, which may be in the form of a sample flame like that shown in FIG. 3. A polarizer 56 is disposed on the optical axis 12 and spaced between the sample source 52 and a detector 22, like any of those described in connection with FIGS. 3 and 3A.

The electromagnet 52 subjects the sample 54 to a magnetic field of a given intensity with the lines of force oriented normal to the optical axis, and thus provides a light component at the resonance wavelength polarized parallel to the magnetic lines of force and components at shifted wavelengths polarized perpendicular to the lines of force. The first component corresponds to the $\pi$ component illustrated in FIG. 1 and is a plane polarized wave normal to the plane of the drawing and vibrating parallel to the lines of force. The polarizer 56 (FIG. 5) may be maintained in a stationary orientation or position once it is adjusted in respect to its angular position about the axis 12 so that it blocks this parallel, or $\pi$, component produced by the normal magnetic field.

Consequently, when the sample is subjected to the magnetic field intensity, the center of resonance wavelength is blocked and only the shifted $\sigma$ light components vibrating perpendicular to the field pass to the detector 22, which provides a first measurement signal indicative of the background absorption. When the current through the electromagnet 52 goes to zero, the magnetic field intensity is reduced to zero and the sample source assumes its unpolarized characteristics with the absorption line 5 (FIG. 1) at the resonance wavelength of the reference source 50. Under these conditions, the detector 22 provides a second measurement signal indicative of the sample plus background absorption. The difference between the first and second signals can then be used to provide a corrected measure of the sample element concentration. Of course, the reference source 50 is assumed to produce a line broad enough to span the Zeeman splitting.

While the arrangement of FIG. 5 is advantageous relative to that of FIG. 3 in not requiring optical transmission through the magnet pole pieces, such as by means of the apertures 42 and 44 in the electromagnet 20, there is a resulting loss of light intensity because the $\pi$ component does not contribute to the output signal. Since the total or 100% of the possible intensity that can be achieved has a contribution of 50% from the parallel $\pi$ component and 50% from the combined perpendicular $\sigma$ components, the maximum theoretical intensity is no greater than 50% of the intensity obtained with the apparatus of FIG. 3. Additionally, however, in any practical arrangement there will also be some losses experienced from the filter 56, so that an actual intensity will be obtained of somewhat less than 50%.

The basic arrangement of FIG. 5 is shown in somewhat modified form in FIG. 6, wherein the apparatus comprises the same hollow cathode light source 50 to provide a monochromatic beam along optical axis 12, through the sample source 54, a polarizer 56 and detector 22. However, a constant flux magnet 58, which may be any suitable type of permanent magnet or a d.c. electromagnet, is substituted for the a.c. electromagnet 52 of FIG. 5. Thus, the sample is subjected to a magnetic field of a given intensity with the lines of force oriented normal to the optical axis 12 for providing a light component at the resonance wavelength polarized parallel to the magnetic lines of force and two other light components shifted in wavelength on each side of the resonance wavelength polarized perpendicular to the magnetic lines of force. These parallel and perpendicular polarized components correspond respectively to the $\pi$ and $\sigma$ components depicted in FIG. 1.

The polarizer 56 is rotated in its plane normal to and about the optical axis 12 so that the detector 22 receives the components of different polarizations sequentially in time. For example, the detector 22 may first receive the shifted or perpendicularly polarized components to provide a first measurement signal indicative of the background absorption in the sample, and then it will receive the parallelly polarized component which is not shifted by the magnetic field and is at the resonance wavelength of the sample so that it will provide a second measurement signal indicative of the sample plus background absorption. Suitable means are then provided to derive an output signal corresponding to the difference between the first and second signals so that a corrected measure of the sample element concentration is obtained. This, of course, may be readily achieved by plotting the output as a function of the angular rotation of the polarizer 56. With the polarizer 56 rotating at a constant rate, the difference in peak value may be taken at points corresponding respectively to the parallel and perpendicular polarization angles, and the results may be averaged by a multiplicity of readings produced by rapid rotation of the polarizer during the measurement.

The arrangement of FIG. 6 is advantageous with respect to that of FIG. 5 in the sense that a relatively high magnetic field may be produced without requiring any electrical supply for the magnet, or if a d.c. electromagnet is employed, this can be generated by a power supply of much less complexity than that normally required for high power a.c. electromagnets. The power requirements and mechanisms for rotating the polarizer 56 will generally be easily accomplished, and any small electric motor may be used to rotate a polaroid mounted within a rotatable cage, frame or bearing. Although the use of the different plane polarized light components for providing the two measurement signals results in only 50% of the maximum light intensity, the arrangement of FIGS. 5 and 6 provide what can be considered to be 100% modulation of the beam. In this connection, however, it may be noted that in the FIG. 6 embodiment all of the components are read out, while the $\pi$ component is always blocked in the FIG. 5 embodiment.

FIG. 7 shows another arrangement having the same hollow cathode 50 providing a beam of a given resonance wavelength along the optical axis 12 through the sample 54 to a detector 22; however, the constant flux magnet 58 is positioned so that the lines of force of the magnetic field are directed through the hollow cathode reference light source 50 normal to the optical axis 12 and the polarizer 56 is located between the light source 50 and the sample 54. As before, the polarizer 56 is mounted for rotation about the axis 12 and in a plane normal thereto. This arrangement produces results which are similar to those produced by the arrangement of FIG. 6 in that the rotating polarizer 56 successively separates the light components by polarization. With the constant perpendicular magnetic field applied to the hollow cathode source 50 and the rotating polarizer 56 positioned between the source and the sample flame 54, the light reaching the sample flame will alternate between the $\pi$ component at the resonance wavelength polarized parallel to the field and the $\sigma$ components at the shifted wavelengths polarized perpendicular to the field.

Thus, during the transmission of the $\sigma$ components through the sample, the output light intensity at detector 22 will be relatively high and indicative of just the background absorption. On the other hand, when the polarizer 56 permits the transmission of the $\pi$ component which is polarized in a direction parallel to the magnetic field and is at the resonance wavelength of the sample, the intensity detected at detector 22 will be relatively lower and indicative of the absorption caused by the sample and background. Again, by determining the difference between the detected signals, the corrected measure of the sample element concentration may be established.

FIG. 8 shows another arrangement where a penpendicular magnetic field is applied across the reference light source 50, but a varying magnetic field is produced by the a.c. electromagnet 52. The emitted reference light beam is directed along the optical axis 12 through the sample flame 54 and to the detector 22. In this embodiment, no polarizer is employed. Thus, when the current through the electromagnet is at its peak, the reference light source will emit the $\sigma$ components at the shifted wavelength and a $\pi$ component at the resonance wavelength. The $\pi$ component will be absorbed by the sample flame 54, while the $\sigma$ components will not be absorbed and will pass to the detector 22. When the current through the electromagnet goes to zero, the magnetic field will also be reduced to zero, and the emitted light will be entirely at the resonance wavelength. Thus, there will be greater absorption by the sample 54 and a corresponding reduction in intensity at the detector 22. The difference between these measurements provides a corrected measure of the sample element concentration. However, because of the presence of a component at the resonance wavelength during both measurements, the modulation of the signals may be considered as about 50%, even though 100% of the light intensity has been utilized.

By adding a stationary polarizer like that in the embodiment of FIG. 5, to block the π component when the magnetic field is applied to the source 50, the modulation factor will be increased to 100%, although the light intensity level will drop accordingly. When operating with relatively strong reference light sources, more accurate determinations may be more easily made when utilizing the 100% modulation factor to achieve the greatest difference in intensity between the measurements corresponding to the background absorption alone and the absorption of the background and sample.

FIG. 9 shows an arrangement utilizing a magnetic field parallel to the optical axis and employing an electromagnet 60 similar to that shown in FIG. 3 but arranged to apply the magnetic field across the reference source 50 rather than the sample flame 54. In this case, when the current through the electromagnet is at its peak, the reference light beam will contain only the circularly polarized σ components which are shifted from the resonance wavelength. Thus, when the beam passes through the sample flame 54 the intensity at the detector 22 will be relatively high and correspond to only the background absorption. When the magnetic field is reduced to zero, the source light beam will be unpolarized at the resonance wavelength and the light received at the detector 22 will correspond to the total absorption of the background and the sample. This arrangement will provide 100% signal modulation at 100% of the possible light intensity. On the other hand, it requires a special magnetic pole structure having an aperture or similar light passage to permit the light beam from the reference source 50 to be transmitted to the sample 54.

Referring now to FIG. 10, there is shown an embodiment in accordance with the principles of the invention for correcting background emission, rather than absorption, in spectro-chemical analysis. In this arrangement, the sample to be measured is utilized as the source of light, such as by introducing the sample into the flame 62 by means of standard and well known techniques previously mentioned, and the light beam thereby produced is transmitted into the apparatus along the optical axis 12 through a suitable opening or window (not shown) in the housing 64. The apparatus comprises an a.c. electromagnet 66 having it poles oriented to produce a magnetic field parallel to the optical axis 12, and a gaseous element absorption filter cell 68 located between the two poles of the electromagnet 66. The cell 68 is generally centered on the optical axis 12 and contains a predetermined amount of a reference sample of the same element as the element being measured (i.e., the element introduced into the sample flame 62). Suitable valves 69 and 69', as shown, are provided for the introduction and removal of the reference sample to or from the cell 68. Any suitable transparent chamber of quartz or other nonabsorbing material at the wavelengths of interest may be used for the absorption filter cell. A small electric heater 70 may be provided and disposed adjacent the reference sample filter 68 to maintain the reference element in its gaseous state at a predetermined and known vapor pressure. A detector and read out means 72 of any suitable type is provided within the housing 64 and may have a photocell, such as a photomultiplier tube, on the optical axis 12 and connected electrically to suitable detector and read-out circuitry which may be used to drive a meter, oscillograph, or other display equipment to provide a corrected measure of the concentration of the sample element to be measured. An alternating current generator 74 is connected to the a.c. electromagnet 66 through a suitable switch 76 to provide a magnetic field across the reference sample filter 68 which varies from zero to a given intensity sufficient to adequately split or shift the resonance wavelength of the reference sample element.

In operation, upon introduction of the sample to the flame 62 and the closure of switch 76, a sinusoidal waveform will appear at the output of the detector and read-out means 72 (assuming an oscillograph or scope is employed as the visual indicating means) similar to that depicted in FIG. 4A. This waveform will correspond generally to the frequency and waveform of the generator 74, assuming that the magnet does not saturate. Thus, at the peak field intensity, minimum absorption by the filter 68 will occur, and a maximum intensity reading will be provided indicative of the sum total of the background and sample emission of the source. At the point of minimum or zero field intensity, there will be maximum absorption by the filter 68 and a minimum intensity reading will be provided indicative of only the background emission. The absolute value of the difference between the two readings will be a measure of the sample element concentration in the sample source 62.

The arrangement of FIG. 10 provides a convenient self-contained piece of equipment which can be employed with any external sample and light source to automatically provide corrected measurements of the sample element concentration. Thus, it may be used as a substitute for a conventional spectrophotometer in emission spectroscopy or spectro-chemical analysis when a suitable interference filter is positioned on the optical axis to block unwanted wavelengths which may "flood" the light detector.

An alternative arrangement is illustrated in FIG. 11 which will also provide a corrected measure of the sample element concentration in emission spectrochemical analysis. Here, as before, the same sample source 62 provides the light beam along optical axis 12 through a suitable opening or window in the apparatus housing 64. But in this apparatus, rotatable polarizer 76 is mounted for rotation about the axis in a plane normal thereto and driven by any suitable low voltage motor 78 through any conventional pulley and drive belt arrangement, as shown. Additionally, a constant or static magnetic flux is applied to the filter cell 68.

The gaseous element absorption filter cell 68, like that shown in FIG. 10, is positioned after the polarizer 76 on the optical axis 12 and the detector and read-out apparatus 72, also like that shown in FIG. 10, is positioned to respond to the intensity of the light beam along the optical axis. The low voltage electric heater 70 is placed in heating relation to the filter 68 to maintain the gaseous element at a predetermined and known vapor pressure. The constant flux magnetic field is applied to the reference sample absorption filer 68 perpendicular to the optical axis 12 by magnet 80, which is preferably high power permanent magnet, but may be an electromagnet operated from a d.c. supply. Of course, the use of a high power permanent magnet, such as may be made of Alnico or various ceramics, obviate the necessity for a power supply to energize the magnet.

In operation, the polarizer 76 provides plane polarized light which has the direction of vibration rotating continuously with time about the optical axis 12. The magnetic field produces the Zeeman effect characteristics on the absorption filter 68 like those depicted in FIG. 1. When the polarizer 76 is rotated to the position wherein it provides a polarized beam vibrating perpendicular to the magnetic field, the detector and read-out will provide an indication of the total sample and background emission from the source, and when the polarizer 76 is rotated to a position where it provides light having a polarization parallel to the magnetic field, the detector and read-out will provide an indication of the emission from the background, assuming that the sample source is sufficiently broad to span the Zeeman shift.

The difference between these two readings will correspond to the sample element concentration. Alternatively, the polarizer 76, and its associated components for providing rotation, may be placed between the reference sample absorption filter 68 and the detector and read-out apparatus 72. In the latter case, the steady-state component of the output signal will be less than that produced in the former case, but in either case this should not affect the output measurement which is based only on the fluctuating component.

The apparatus illustrated in the FIG. 11 embodiment, in addition to providing a self-contained unit which may take place of a conventional spectrophotometer, when filtering is employed, also provides the advantage of avoiding the requirement for a source of high power alternating current like that illustrated as 74 in FIG. 10. In addition to the supply for operating the detector and read-out apparatus 72, the apparatus of FIG. 11 requires only a low energy supply to drive the polarizer motor 78 and the heater element 70. Although these devices are illustrated with separate terminal pairs for connection to a suitable electric supply, they may be driven in parallel by a common supply, which may be that used for the detector and read-out 72, such as the a.c. line.

As can be seen, other arrangements for emission spectroscopy may be employed if desired, such as by employing an alternating current magnet perpendicular to the optical axis instead of a permanent magnet as used in FIG. 11, and then a fixed polarizer may be provided on the optical axis to block the resonance wavelength component vibrating parallel to the magnetic field.

Likewise, the FIG. 10 embodiment may be modified by placing the longitudinal varying field on the sample source and the apparatus will perform in substantially the same manner. With respect to the FIG. 11 embodiment, however, placing the transverse constant magnetic field on the sample source will permit a source of narrower or finer line width to be used and should provide a commensurate increase in accuracy.

Figure 12:
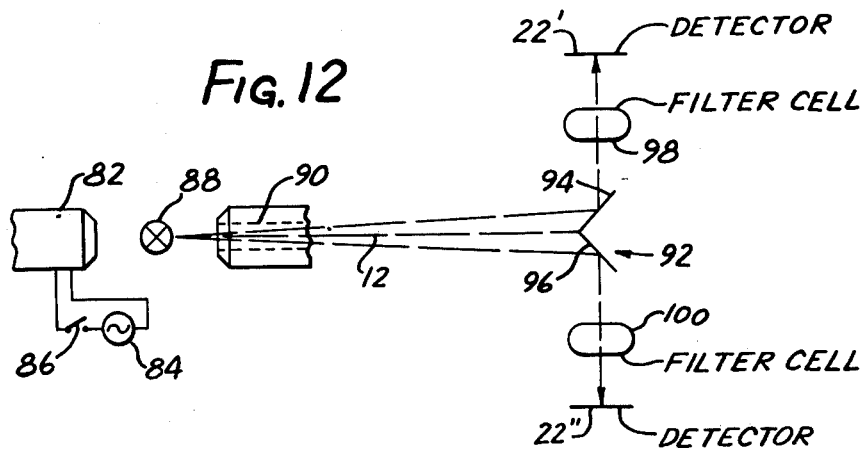
Figure 13:
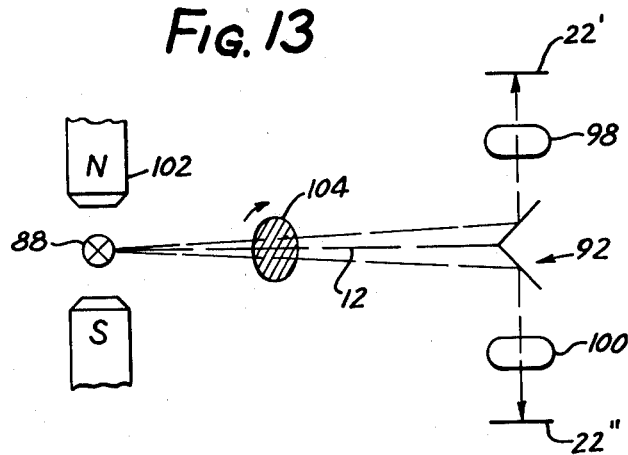

FIGS. 12 and 13 illustrate two techniques for measuring multiple unknowns by emission spectroscopy using appropriate absorption filter cells for each of the elements to be measured. These are examples of apparatus arrangements in which the Zeeman effect can be used to correct for background emission and facilitate multielement analysis without using a monochromator. In both cases the elements to be analyzed are introduced into an emitting source in a magnetic field, and the light is divided into several beams with mirrors. An interference filter, a resonance absorption cell and a photocell are placed on each beam. The a.c. component of each photocell will be a measure of the concentration of that element in the source.

In particular, as shown in FIG. 12, an a.c. electromagnet 82 is energized by an alternating current source 84 through a switch 86 to provide a magnetic field of a given varying intensity across the sample light source 88 parallel to the optical axis 12 and having an aperture 90 through one of the magnet pole pieces to permit the light from the atomic emission to be directed to a beam splitting mirror 92. The mirror 92 has two reflective surfaces 94 and 96 90° apart and 45° from the optical axis 12 so that the light beam is split into two indentical beams at 180° which are each passed through separate filter cells 98 and 100, and then to respective detectors 22' and 22". The filter cells 98 and 100 each contain a different element in its gaseous state corresponding to the elements of the unknowns which have been introduced into the sample source flame 88. Thus, the detectors 22' and 22" each provide the measurement signals from which the concentration of the respective elements are determined. The operation of the apparatus of FIG. 12 is like the apparatus of FIG. 10, except that the varying magnetic field is applied to the sample source rather than to the absorption filters. Since the performance of the system is substantially the same whether the magnetic field is applied to the source or to the filter, the application of the field to the light source permits the use of only one magnet, rather than a separate magnet associated with each filter in multiple unknown analysis.

FIG. 13 is a variation of the arrangement of FIG. 12 with the use of a constant flux magnetic field provided by permanent magnet 102 and the rotating polarizer 104 between the sample light source 88 and the mirror assembly 92. The absorption filter cells 98 and 100, corresponding to each of the unknowns in the sample source 88, and the detectors 22' and 22", are identical to those components illustrated and described in connection with FIG. 12. The operation of the arrangement shown in FIG. 13 utilizes the separation by the rotating polarizer 104 of the light emission from the sample source 88 into $\pi$ and $\sigma$ components associated with each of the unknowns. When the $\sigma$ components are passed to the mirror assembly 92 they are reflected through the filters 98 and 100 and provide an indication at the detector 22' and 22", of the total amount of sample and background emission due to each of the unknown sample elements. When the $\pi$ component is passed and reflected through the filters corresponding to each of the unknown samples, the corresponding detectors provide measurement indications corresponding to the amount of background emission for both of the elements.

The use of the Zeeman effect for background correction has been found through experimentation with sodium to work visually, i.e. through direct observation by the naked eye, and also with cadmium sulfide photocells. For example, a small screen, such as is normally used for home movies, was employed to reflect the light beam after it has passed through the flame in the magnetic field. The magnetic field was generated by an electromagnet connected to a direct current source and the poles of the magnet were oriented so as to apply the magnetic field to the flame parallel to the optical axis of the light beam. With the magnet on, a definite decrease in light intensity was observed when the burner was lighted, but this decrease depended very little on the amount of sodium in the flame. When the flame was left on and the magnet was turned off, there was a still further and larger decrease in light intensity, and this decrease was a direct function of the amount of sodium in the flame. However, it was found that for most of the elements that had their resonance lines in the ultraviolet region of the spectrum, a much stronger magnetic field will be required for adequate separation, as compared to sodium.

More extensive experimentation was done with mercury which has a sufficiently high vapor pressure ($10^{-3}$ Torr) at room temperature that a one centimeter cell with a drop of mercury in it will absorb a large portion of the resonance light from a mercury lamp. A modified Beckman DB spectrophotometer was used, the instrument being modified as described later by Woodriff et al. in Applied Spectroscopy, Volume 24, (1970) Page 550 through 553, and generally illustrated schematically in FIG. 15, described in detail hereinafter. The instrument, designated as 110 in FIG. 15, operates in a double-beam mode for measuring the relative intensities of the two beams which are generated by a vibrating or oscillating mirror system, shown in simplified form as 112, after the light has passed through a low-resolution grading monochromator. The ratio ($I_r - I_s$)/$I_r$ is measured, where $I_r$ is the intensity of the reference beam and $I_s$ is the intensity of the sample beam. By placing two Glan-Taylor polarizers 114 and 116 in the sample and reference compartment of the instrument, the capability of measuring either the degree of polarization of a single beam or the relative intensities of two colinear perpendicularly polarized beams is provided. Each beam is in turn incident on a photodetector, preferably at the same position thereon although not so shown in FIG. 15, and the electrical output signal is fed to comparison circuits, including appropriate amplifiers, which drive a meter to provide a measure of the absorption of the $\pi$ component which is automatically corrected for background absorption by the $\sigma$ component. The Beckman DB spectrophotometer comes with the vibrating mirror system and electronics and meter as an integral part of the instrument. All that is necessary is to place the two properly oriented polarizers in the sample and reference compartments.

Since, generally the magentic field is horizontal, a horizontal polarizer is used for the sample beam and a vertical polarizer for the reference beam. Since optical components can rotate or partially polarize the polarized light, the instrument was tested and found to cause rotation of less than one degree and only about 2% de-polarization. No change in the sensitivity for the sample atomic absorption of mercury was observed as the slit width was changed, indicating there were no appreciable interferring lines within about 50 Angstroms of the 2537 A resonance line.

Additionally, the apparent width of the resonance line depends largely upon the temperature of the light source. The light source should be at the same temperature as that of the absorbing atoms for best results, and since the absorption cell was maintained at room temperature, a considerable increase in sensitivity was achieved by maintaining the lamp at a relatively low temperature. An air stream for cooling was used with the mercury vapor lamp, but any other suitable means for cooling may alternatively be employed. Also, a water cooled hollow-cathode lamp may be expected to provide a very narrow resonance line and thus high sensitivity, where such a lamp may be employed in the apparatus previously discussed. The intensity of resonance emission generally increases as the temperature of the lamp increases, but for the mercury lamp an increase in the temperature appears to decrease the intensity if the temperature is above a certain level. The intensity of the emission will also generally increase as the current or voltage is increased, and thus the actual intensity of the lamp may be determined by the combined influences of current and temperature.

The magnetic field may also cause a large change in emission intensity of a mercury lamp. For example, placing a mercury Pen-ray lamp in an 8 KG. magnetic field more than doubles the steady-state intensity of the lamp. If this magnetic field is then turned off quickly, the intensity will momentarily double again before returning to its original intensity. Similarly, if the field is above about 4 kilogauss and is increasing rapidly, the intensity momentarily drops before going to the steady-state value. Variations in light intensity for hollow-cathode lamps may also be experienced due to these, as well as possibly other factors.

Also, in experiments using mercury vapor, for accurate analysis, care should be taken to avoid interference due to the generation of ozone by excluding oxygen or the 1850 Angstrom radiation from the optical path of the apparatus. Most mercury lamps have quartz windows which transmit the 1850 Angstrom line of mercury as well as the 2537 Angstrom line, thus producing ozone photochemically from the surrounding air. This ozone concentration may be expected to build up to a very high level if the air in the optical path is confined or stagnant.

The experiments with mercury were conducted with arrangements, as previously discussed, wherein a fixed or constant magnetic field was provided on the lamp or the sample chamber or both. With a single d.c. magnet, two basic arrangements may be considered. First, the magnet may be placed so that the field intersects the lamp, causing the lamp to emit normal resonance light polarized parallel to the field as well as perpendicularly-polarized frequency-shifted light to equal intensity (FIG. 1), the arrangement being shown in FIG. 14 (as well as generally in FIG. 7). Second, the magnet may be placed so that the field intersects the absorption cell, causing light polarized parallel to the field to be absorbed in a normal manner while light polarized perpendicular to the field is absorbed only at shifted frequencies, such an arrangement being similar to that shown in FIG. 6.

Experiments were conducted using a hand magnet rated at 4300 gauss with a one-centimeter spectrophotometer cuvette serving as the sample chamber for the mercury vapor. A definite increase in the percent transmission of the sample was observed when the magnetic field was applied; however, the change (about 20% of maximum) would require relatively sensitive electronic equipment for practical application of the method. Using a Varian series variable d.c. electromagnet, the effects of a magnetic field at different field strengths could be measured, and the particular arrangement chosen for testing is that shown in FIG. 14 (although the arrangement of FIG. 15 was also used).

The detector assembly in FIG. 14 includes an IP-28 (RCA) photomultiplier tube 130 as well as a power supply and an oscilloscope connected in the well known manner to view the light intensity received by the photomultiplier tube. A 2520 Angstrom interference filter 132 serves as the monochromator. Although the use of an interference filter is normally not recommended in spectro-chemical analysis because of the danger of other atomic lines interferring with the desired line, in the utilization of the Zeeman effect in accordance with the present invention, such lines generally do not interfere. A Pen-ray mercury lamp 134 is located at the opposite end of the apparatus and directs the light along the optical axis 12 through the absorption cell 136 which is used as the sample chamber and comprises a glass tube with silica plates or windows on each end. The chamber is about 14 inches long and has connecting tubes 142 and 144, respectively, for the entrance and exit of gas. A bubble chamber 146 is connected to the entrance tube 142 and contains a solution of the sample to be measured and one milliliter of 12% stannous chloride solution made up to a total volume of about 30 milliliters with distilled water, the solution being designated as 148. An input pipe 150 is then used to bubble compressed air from a suitable source through the solution, and the air then carries the mercury vapor picked up from the solution to the sample chamber. A mixing time of about two minutes is used to allow all of the mercury to be reduced to the elemental state before bubbling the air therethrough. A flow rate of about 0.4 cubic feet per hour and a magnetic field strength from the magnet 152 of 14,000 gauss were used in most instances, and were found satisfactory.

A rotating polarizer 154 was employed to create an a.c. signal at the detector 22 corresponding to $I_s - I_r$. Rotation of the polarizer was accomplished in at least some of the experiments by mounting the polarizer on the inner ring of a concentric ring ball bearing, maintaining the outer ring stationary, and coupling the inner ring to a motor by means of a rubber band and pulley arrangement.

The signal from the photomultiplier 130 appeared on the oscilloscope 131, and any absorption due to mercury showed up as a 30 cycle per second sine wave, whereas the background absorption showed up only as a change in the d.c. or reference signal level.

The signal observed using a 14,000 gauss magnetic field and a one centimeter cell containing saturated mercury vapor is shown in FIG. 16. As there illustrated, the sinusoidal waveform oscillates between the reference and sample beam intensities, $I_r$ and $I_s$, which is shown with respect to a reference voltage line $I=0$ and with respect to the voltage level corresponding to maximum lamp intensity. FIG. 17 is a plot of the sensitivity of the apparatus, i.e., $I_r/I_s$, versus the magnetic field strength. Most of the irregularities in the curve are believed to be due to the hyperfine splitting of the mercury line. As can be seen, the sensitivity generally increases with the strength of the magnetic field, and should ultimately level off.

The absolute sensitivity of the apparatus of 14,000 gauss is illustrated by the calibration curve of FIG. 18 which plots optical density (or beam intensity) as a function of the concentration of mercury in the sample.

Although these results show good sensitivity and accuracy by ordinary standards, the remaining limitations on accuracy are principally due to the presence of noise in the output, and such noise originates primarily from factors such as fluctuations of lamp intensity, power supply voltage, and photomultiplier amplification. These may be reduced by merely employing standardized electronic equipment in accordance with known technology. For example, a feedback loop may be used to control the lamp intensity to maintain a constant output, such as by regulating the voltage to the lamp in response to light intensity variations detected by an auxiliary photoelectric cell the output of which is compared to some standard reference. The power supply voltage may be regulated by commercially available regulators and maintained within a small fraction of a percent of a given value. The photomultiplier amplification factor may be improved by selecting a high quality tube and/or the use of well known stabilization circuit techniques. Also, of course, other types of photoelectric responsive devices may be utilized, such as junction photovoltaic cells, e.g., semiconductor solar cells, or photoresistive devices, if a light source of sufficient intensity is employed.

In the present experiments, background signals were observed in almost all determinations, even though reagent-grade mercuric chloride was used, indicating that such an instrument would be very unreliable without background correction, in merely a single-beam mode of operation. For example, absorbances as great as 0.2 were observed for water vapor alone.

Impurities such as benzene and toluene were added to the samples, and only increases in the background absorption, (i.e., in the d.c. level) were observed, thus substantiating that only mercury was producing the a.c. signal illustrated in FIG. 16 which is the corrected measure of the mercury concentration in the sample.

In addition to the foregoing examples of various arrangements of apparatus for providing background correction in spectro-chemical analysis through the use of the Zeeman effect, it is possible to eliminate most background interferences through the use of certain other arrangements involving the application of a magnetic field and using effects generally related to the Zeeman effect, though not considered to employ the Zeeman effect, per se. These arrangements utilize in their operation the Faraday effect and the effects of magnetic double refraction.

Figure 19:
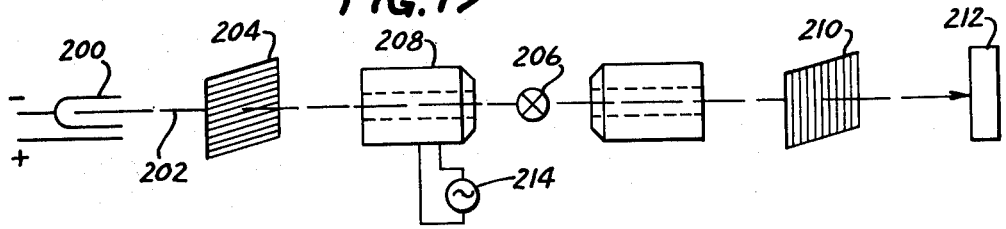

More particularly, FIG. 19 shows an arrangement of apparatus for utilizing the Faraday effect for background correction. A hollow-cathode reference light source 200, like that previously described, directs a light beam of the resonance wavelength of the sample to be measured along the optical axis 202 through a first polarizer 204, a sample 206 in the gaseous state and positioned in a longtiudinal oscillating magnetic field produced by apertured magnetic pole pieces 208, and then through a second polarizer 210 crossed with respect to the first polarizer 204, and finally to a detector system 212 which is phase-locked to the oscillations of the magnetic field produced by an alternating current generator 214 connected to the electromagnet 208. The detector 212 may be a spectrophotometer or employ a photocell with an interference filter. Any suitable read out may be used.

The arrangement of FIG. 19 operates as follows. The first polarizer 204 polarizes the source light with a given angular orientation of the electric vector, such as horizontally. With the magnet off, the light passes through the sample and is blocked by the second polarizer 210. With the magnet on, the light from the first polarizer has its plane of polarization rotated by the sample atoms in the longitudinal magnetic field. The rotated light passes through the second polarizer and is measured by the detector 212. Elements other than those with resonance lines in the wavelength region observed, ordinarily do not rotate the plane of polarization. Thus, the a.c. signal provided by the detector 212 is a measure of the background corrected light intensity corresponding to the concentration of the sample element. Light produced by the sample 206, itself will merely add the d.c. component or reference level to the output signal since it will be generally steady over the alternating magnetic field cycles.

Figure 20:
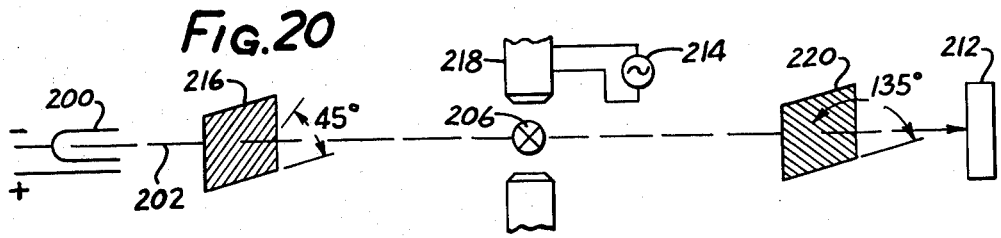

FIG. 20 shown an arrangement of apparatus which operates on the principle of magnetic double refraction, and which is also related to the Zeeman effect. Again, a hollow-cathode reference light source 200 is used to direct a beam along the optical axis 202 through a first polarizer 216 and through the gaseous sample 206 in a transverse oscillating field produced by the electromagnet 218, and then through a second polarizer 220 and finally to a detector 212 which is phased-locked to the oscillations of the magnetic field which are determined by the alternating current supply 214 coupled to the electromagnet 218. The transverse magnetic field produced by the magnet is oriented 45° to the electric vector of the light passing through the first polarizer 216 and is 90° to the path of the light beam along the optical axis 202. The second polarizer 220 is crossed with respect to the first polarizer so that it is oriented at minus 45° from the magnetic lines of force.

In operation, the first polarizer provides a beam of plane polarized light having the electric field vector at 45° to the magnetic field. With the magnet off, this light beam goes through the sample 206 and is blocked by the second polarizer 220. With the magnet on, the light at the sample 206 is divided into two components, one having its electric vector parallel to the field and the other having its electric vector perpendicular to the field. These two components travel with different velocities due to different indices of refraction of the gaseous sample when subjected to the magnetic field. When these two components emerge from the sample, they recombine to form a single beam with a different polarization than the original beam from the first polarizer 216. Therefore, this rotated beam is transmitted through the second polarizer 220 to the extent of its rotation. The detector 212 will provide an output signal similar to that in the FIG. 19 arrangement.

Figure 21:
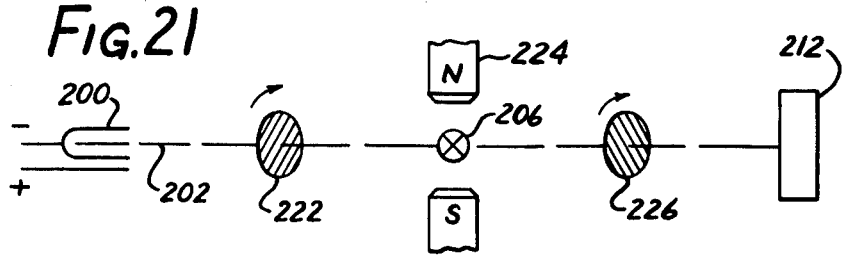

FIG. 21 shows an alternative arrangement employing magnetic double refraction, where the reference light source 200 supplies the light beam along the optical axis 202 through a first rotating polarizer 222, a gaseous sample 206 in a transverse constant or static magnetic field produced by magnet 224, and then through a second rotating polarizer 226 synchronized and crossed with the first polarizer 222, and finally to detector system 212 phase-locked to the synchronous rotating polarizers. The magnet 224 may be of the permanent type or a d.c. electromagnet.

The principles of operation of this arrangement are essentially the same as those involved in the arrangement shown in FIG. 20. The synchronous rotation of the polarizers 222 and 226 takes the place of the varying magnetic field in providing an a.c. signal component from the detector 212.

In all of the arrangements of FIGS. 19 through 21, the amount of rotation of the light in the sample is a function of the magnetic field strength and the amount of sample element present. Since the magnetic field strength is assumed to vary between constant levels, the rotation is a function of the element concentration. This function is preferably determined by plotting a calibration curve with known element concentrations. In some cases where the element concentration is very great and/or the field strength is very high, rotation of greater than 360° may be produced and blocking of the output light from the source may occur for some wavelengths. This can be obviated by diluting the sample or by reducing the magnetic field strength.

Thus, the various methods and apparatus herein described effectively provide atomic absorption or emission analysis by techniques using the Zeeman effect and related effects employing a magnetic field applied to the source or sample. These methods and apparatus eliminate the background absorption or emission contribution to measurement automatically so that quantities of an unknown can be measured which are orders of magnitude smaller than those which can be determined by the usual methods. Additionally, the present methods and apparatus employ only a single source and a single detector. With only mercury 199 isotope in the lamp, the magnetic field needed to effect a complete separation of the split lines from the absorption profile can be reduced to about 10 kilogauss, so that the apparatus can be made portable. A smaller magnetic field may also be used for mercury analysis when an evacuation absorption cell is employed, since the absorption profile is much narrower in a low pressure cell. Similarly, the use of resonance lamps which emit very narrow lines allows the complete separation of Zeeman-split lines with relatively lower magnetic fields. While resonance lamps ordinarily provide lower intensity, this may well be acceptable in the practice of the present invention, since a spectrophotometer may not be required.

Although a hollow-cathode type of light source was illustrated in a number of the examples given herein, various other types of sources may alternatively be employed. For example, the reference light source may be a flame, a quartz lamp (such as an Osram spectral lamp), or any means for providing a monochromatic light beam by selective emission or by filtering. The light source should desirably provide the sample line with a high intensity, but could include other emission wavelengths so long as they are not so near to the sample line that they would interfere with the measurement. However, the presence of other relatively close emission wavelengths might be tolerable if a sufficiently selective detector were used.

In the various examples illustrated herein, the sample is introduced into a flame. However, as discussed hereinbefore, the sample may be introduced into the system in various other ways, such as by means of a furnace or other apparatus which provides the sample in a gaseous state. In many applications the sample will occur at normal room temperature in a gaseous state, or at least with a sufficiently high vapor pressure so that it can be detected, and thus may be merely placed in an enclosed chamber. Mercury, is an example of such an element.

Since, as noted above, the application of the magnetic field to the reference source may, in some situations, change the source intensity, in those situations it may be generally desirable to use a method wherein a constant magnetic field is employed together with a rotating polarizer. For elements in the ultraviolet range, such as mercury, it is also desirable to provide means for cooling the reference lamp, and for removing ozone which may be generated along the optical axis of the apparatus.

In all of the examples utilizing the Zeeman effect, the shift in resonance wavelength is accomplished by either changing the intensity of the magnetic field between two different levels or by the selective blocking of previously shifted lines with a polarizer or filter. The selection of the specific arrangement of particular devices employing the principles of the invention may depend on the specific application involved. The invention can be advantageously employed in many diverse applications, including, for example, the measurement of trace elements in the atmosphere, in water, soils, drugs or in biological materials. Although various embodiments of the invention have been illustrated and described, they will suggest to persons skilled in the art a number of variations and modifications, some being immediately obvious and others obvious upon study of the basic teachings of the invention. Accordingly, the scope of the protection to be afforded the invention should not be limited by the particular embodiments shown and described, but should be determined in terms of the definitions of the invention set forth in the appended claims, and equivalents thereof.

Various features of the invention are set forth in the following claims.

What is claimed is:

1. A method of providing a background corrected measure of the concentration of a sample element utilizing magnetic double refraction, comprising the steps of:
   a. positioning a sample in a gaseous state containing an element having a given optical resonance wavelength on an optical axis,
   b. subjecting the sample to a magnetic field transverse to said optical axis,
   c. directing along the optical axis and at the sample a beam of plane polarized light having said resonance wavelength, at least at a given time said beam of plane polarized light being polarized at such an angle relative to the transverse magnetic field as to cause the light at the sample to divide into two components, one component having its electric vector parallel to the field and the other component having its electric vector perpendicular to the field,
   d. permitting said two components to re-combine upon emergence from the sample to form an emergent beam polarized at an angle different from that of the incident beam of plane polarized light,
   e. passing said polarized emergent beam through a polarizer crossed with respect to the polarization of the incident beam of plane polarized light, and
   f. detecting the differential intensities of said polarized emergent beam after it passes through said polarizer at said given time and at some other time to provide a measure of the sample element concentration.

2. The method of claim 1 wherein the magnetic field applied to said sample is varied between different magnetic intensities.

3. The method of claim 1 wherein the magnetic field applied to said sample is periodically varied between different magnetic intensities.

4. The method of claim 1 wherein the incident beam of plane polarized light is polarized at an angle of 45° from the magnetic field about the optical axis.

5. The method of claim 1 wherein the magnetic field applied to the sample transverse to said optical axis is maintained constant, the polarization angle of the incident beam of plane polarized light is rotated about the optical axis, and the polarizer is rotated synchronously with the incident beam rotation, while maintaining a crossed relationship therebetween.

6. Apparatus for providing a background corrected measure of the concentration of a sample element, by magnetic double refraction, comprising:
   a. means for providing a sample element in a gaseous state on the optical axis, the element having a given optical resonance wavelength,
   b. means for subjecting the sample to a magnetic field transverse to said optical axis,
   c. means for supplying and directing at the sample and along the optical axis a beam of plane polarized light having said resonance wavelength, at least at a given time said beam of plane polarized light being polarized at such an angle relative to the transverse magnetic field as to cause the light at the sample to divide into two components, one component having its electric vector parallel to the field and the other component having its electric vector perpendicular to the field, said components forming a single polarized beam upon emergence from the sample having a polarization angle different from that of the incident beam of polarized light,
   d. a polarizer on said optical axis crossed with respect to the polarization of said incident beam of plane polarized light and positioned to interrupt said emergent beam from the sample, and
   e. means responsive to the differential intensity of the emergent beam after passing through said polarizer at said given time and at some other time for providing a measure of the sample element concentration.

7. The apparatus of claim 6 wherein said means for subjecting the sample to a magnetic field comprises means for varying the magnetic field applied to the sample between different magnetic intensities.

8. The apparatus of claim 7 wherein the variation of the magnetic field is periodic.

9. The apparatus of claim 6 wherein the magnetic field perpendicular to said optical axis is oriented at 45° to the polarization angle of the incident beam of plane polarized light.

10. The apparatus of claim 6 comprising means for rotating the plane of polarization of the incident beam of plane polarized light about said optical axis and means for synchronously rotating said polarizer to maintain said crossed relationship.

* * * * *